US010853744B2

(12) United States Patent
Biewald et al.

(10) Patent No.: US 10,853,744 B2
(45) Date of Patent: Dec. 1, 2020

(54) DISTRIBUTING A TASK TO MULTIPLE WORKERS OVER A NETWORK FOR COMPLETION WHILE PROVIDING QUALITY CONTROL

(75) Inventors: Lukas A. Biewald, San Francisco, CA (US); Christopher R. Van Pelt, San Francisco, CA (US)

(73) Assignee: Figure Eight Technologies, Inc., San Francisco, CA (US)

( * ) Notice: Subject to any disclaimer, the term of this patent is extended or adjusted under 35 U.S.C. 154(b) by 0 days.

(21) Appl. No.: 12/817,946

(22) Filed: Jun. 17, 2010

(65) Prior Publication Data

US 2011/0313801 A1    Dec. 22, 2011

(51) Int. Cl.
*G06Q 10/06*    (2012.01)

(52) U.S. Cl.
CPC ......... *G06Q 10/0631* (2013.01); *G06Q 10/06* (2013.01)

(58) Field of Classification Search
CPC ............... G06Q 10/06; G06Q 10/0631; G06Q 10/06311; G06Q 10/063112; G06Q 10/063118; G06Q 10/103; G06Q 10/06398
USPC ............................................... 705/7.13, 7.12
See application file for complete search history.

(56) References Cited

U.S. PATENT DOCUMENTS

| 3,417,916 A | 12/1968 | Rudolf et al. |
| 6,248,715 B1 | 6/2001 | Rosenberg et al. |
| 6,249,715 B1 | 6/2001 | Yuri et al. |
| 6,859,523 B1 * | 2/2005 | Jilk ........................ G06Q 10/06 379/32.01 |
| 6,938,048 B1 | 8/2005 | Jilk et al. |
| 7,082,426 B2 | 7/2006 | Musgrove et al. |
| 7,155,400 B1 * | 12/2006 | Jilk ........................ G06Q 10/06 705/7.14 |
| 7,197,459 B1 | 3/2007 | Harinarayan et al. |

(Continued)

FOREIGN PATENT DOCUMENTS

| JP | 2003084818 A | 3/2003 |
| JP | 2003265863 A | 9/2003 |

(Continued)

OTHER PUBLICATIONS

Structures that Work: Social Structure, Work Structure and Coordination Ease in Geographically Distributed Teams.—By Hinds et al.*

(Continued)

*Primary Examiner* — Scott L Jarrett
(74) *Attorney, Agent, or Firm* — Perkins Coie LLP

(57) ABSTRACT

Systems and methods of crowd sourcing by distributing a task over a network to multiple workers for completion while providing quality control are disclosed. In one aspect, embodiments of the present disclosure include a method, which may be implemented on a system, of identifying an attribute of the task, the task including multiple unit jobs, determining target accuracy in completion of the task by the multiple workers, computing a number of results to be collected for a unit job of the task based on the target accuracy, setting a wage amount that is offered to a worker for completing a unit job of the task based on the attribute and the target accuracy, and/or collecting and aggregating statistics of the workers completing the select unit jobs for quality control.

23 Claims, 20 Drawing Sheets

(56) References Cited

U.S. PATENT DOCUMENTS

| | | | |
|---|---|---|---|
| 7,272,575 B2 | 9/2007 | Vega | |
| 7,395,536 B2 | 7/2008 | Vernik et al. | |
| 7,778,865 B1 | 8/2010 | Kane | |
| 7,801,756 B1 | 9/2010 | Harinarayan et al. | |
| 7,885,844 B1 | 2/2011 | Cohen et al. | |
| 7,899,694 B1 | 3/2011 | Marshall et al. | |
| 7,903,783 B2 | 3/2011 | Le et al. | |
| 7,904,323 B2 | 3/2011 | Wynn et al. | |
| 7,908,313 B2 | 3/2011 | Lurie et al. | |
| 7,945,470 B1 | 5/2011 | Cohen et al. | |
| 7,975,026 B2 | 7/2011 | Oh et al. | |
| 1,031,382 A1 | 12/2011 | Biewald et al. | |
| 8,099,311 B2 | 1/2012 | La Vecchia et al. | |
| 8,121,879 B1 | 2/2012 | Cohen | |
| 8,170,897 B1 | 5/2012 | Cohen et al. | |
| 8,172,687 B2 | 5/2012 | Gagner et al. | |
| 8,255,258 B1* | 8/2012 | Cohen | G06Q 30/08 705/7.21 |
| 8,275,803 B2* | 9/2012 | Brown | G06F 17/28 707/802 |
| 8,285,196 B2 | 10/2012 | Rao | |
| 8,295,196 B2 | 10/2012 | Ergen et al. | |
| 8,315,894 B2 | 11/2012 | Naveh et al. | |
| 8,407,073 B2 | 3/2013 | Bagheri et al. | |
| 8,429,088 B2 | 4/2013 | Kaplan et al. | |
| 8,452,629 B2 | 5/2013 | Chaar et al. | |
| 8,554,605 B2 | 10/2013 | Le et al. | |
| 8,694,577 B2 | 4/2014 | D'Angelo et al. | |
| 8,825,523 B2 | 9/2014 | Gillenson et al. | |
| 2002/0069079 A1* | 6/2002 | Vega | 705/1 |
| 2003/0050829 A1 | 3/2003 | Dietz et al. | |
| 2004/0098447 A1* | 5/2004 | Verbeke et al. | 709/201 |
| 2004/0143600 A1 | 7/2004 | Musgrove et al. | |
| 2004/0261013 A1 | 12/2004 | Wynn et al. | |
| 2005/0015501 A1 | 1/2005 | Kaplan et al. | |
| 2005/0154600 A1 | 7/2005 | Feygenson et al. | |
| 2005/0216331 A1 | 9/2005 | Ahrens et al. | |
| 2006/0059490 A1 | 3/2006 | Knapp et al. | |
| 2007/0124363 A1 | 5/2007 | Lurie et al. | |
| 2008/0021755 A1 | 1/2008 | Jones et al. | |
| 2008/0119134 A1 | 5/2008 | Rao | |
| 2008/0133270 A1 | 6/2008 | Michelson et al. | |
| 2008/0209431 A1* | 8/2008 | La Vecchia | G06Q 10/063112 718/104 |
| 2009/0070412 A1 | 3/2009 | D'Angelo et al. | |
| 2009/0210282 A1* | 8/2009 | Elenbaas | G06Q 10/06 705/7.13 |
| 2009/0231134 A1 | 9/2009 | Modica et al. | |
| 2009/0234686 A1* | 9/2009 | Chakra et al. | 705/7 |
| 2010/0010860 A1* | 1/2010 | Bose | G06Q 10/063112 705/7.14 |
| 2010/0017252 A1* | 1/2010 | Chaar | G06Q 10/06 705/7.12 |
| 2010/0057518 A1 | 3/2010 | Naveh et al. | |
| 2010/0069148 A1 | 3/2010 | Cargill | |
| 2010/0095268 A1 | 4/2010 | Lowry et al. | |
| 2010/0144446 A1 | 6/2010 | Oh | |
| 2010/0250359 A1 | 9/2010 | Gillenson et al. | |
| 2010/0293026 A1* | 11/2010 | Vojnovic | G06Q 10/06311 705/7.13 |
| 2010/0317442 A1 | 12/2010 | Thomas et al. | |
| 2011/0066556 A1 | 3/2011 | Kadosh | |
| 2011/0112880 A1 | 5/2011 | Ryan et al. | |
| 2011/0145156 A1* | 6/2011 | Feng | G06Q 10/103 705/301 |
| 2011/0252121 A1 | 10/2011 | Borgs et al. | |
| 2011/0282793 A1* | 11/2011 | Mercuri | G06Q 30/0214 705/80 |
| 2011/0302003 A1 | 12/2011 | Shirish et al. | |
| 2011/0307495 A1* | 12/2011 | Shoshan | G06F 17/2854 707/748 |
| 2011/0313801 A1* | 12/2011 | Biewald et al. | 705/7.12 |
| 2011/0313933 A1 | 12/2011 | Dai et al. | |
| 2012/0029963 A1 | 2/2012 | Olding et al. | |
| 2012/0029978 A1 | 2/2012 | Olding et al. | |
| 2012/0053977 A1* | 3/2012 | Bagheri | G06Q 10/063112 705/7.14 |
| 2012/0072268 A1* | 3/2012 | Ritter | G06Q 10/06 705/7.39 |
| 2012/0150579 A1 | 6/2012 | De Wit | |
| 2012/0265573 A1 | 10/2012 | Van Pelt et al. | |
| 2013/0110590 A1 | 5/2013 | Folk et al. | |
| 2013/0231969 A1 | 9/2013 | Van Pelt et al. | |
| 2014/0039985 A1 | 2/2014 | Oleson et al. | |
| 2014/0122188 A1 | 5/2014 | Van Pelt et al. | |

FOREIGN PATENT DOCUMENTS

| | | |
|---|---|---|
| JP | 2004192061 A | 7/2004 |
| JP | 2007047926 A | 2/2007 |
| JP | 2007141039 A | 6/2007 |
| JP | 2008017946 A | 1/2008 |
| KR | 20040053864 A | 6/2004 |
| KR | 20060122236 A | 11/2006 |
| WO | WO-2008102255 A1 | 8/2008 |

OTHER PUBLICATIONS

Mahajan, Neelima, Labor-on-Demand, CrowdFlower Gets Garners to Do Real Work for Virtual Pay Mission Local, Nov. 5, 2010 (Year: 2010).*

Kittur, Aniket et al., Crowdsourcing User Studies With Mechanical Turk CHI 2008 Proceedings, ACM, Apr. 5-10, 2008 (Year: 2008).*

Lorcia, Ben, Mechincal Turk app on the iPhone provides Work for Refugees Oreilly.com, Oct. 13, 2009 (Year: 2009).*

Kim-Mai, Cutler, TC50: CrowdFlower offers rich analytics for Mechanical Turks Venturebeat.com, Sep. 15, 2009 (Year: 2009).*

CrowdFlower Bolsters a New Era of Work PRWeb, Sep. 15, 2009 (Year: 2009).*

Eagle, Nathan, txteagle: Mobile Crowdsourcing Internationalization Design, LNCS, 2009 (Year: 2009).*

Howe, Jeff, The Rise of Crowdsourcing Wired, Jun. 2006 (Year: 2006).*

Salas, Oscar Figuerola et al., Assessing Internet Video Quality Using Crowdsourcing ACM, Conference 10, 2010 (Year: 2016).*

Chen et al., "A Crowdsourceable QoE Evaluation Framework for Multimedia Content," MM'09, Oct. 19-24, 2009, Beiging, China, pp. 491-500.

U.S. Appl. No. 12/817,979, filed Jun. 17, 2010, Biewald et al.

Stross, Randall, "When the Assembly Line Moves Online," http://www.nytimes.com/2010/10/31/business/31digi.html?pagewanted=print, Oct. 30, 2010, © The New York Times Company, 3 pages.

Torikka, Mikko, "Crowdsourcing startup Microtask gets gamers to do some real work," VentureBeat.com, Mar. 22, 2011, © 2011 VentureBeat, 7 pages.

International Search Report and Written Opinion for PCT/US2011/037626; Date of filing of Application: May 24, 2011; dated Jan. 17, 2012; 10 pages.

International Search Report and Written Opinion for PCT/US2011/037625; Date of filing of Application: May 23, 2011; dated Jan. 19, 2012; 10 pages.

Ipeirotis et al., "Quality Management on Amazon Mechanical Turk," 2010 ACM 978-1-4503-0222-7, pp. 64-67.

Florian Alt. et al., "Location-based Crowdsourcing: Extending Crowdsourcing to the Real World," NordiCHI 2010, Oct. 16-20, 2010, Reykjavik, Iceland, 10 pages.

International Search Report and Written Opinion for PCT/US2012/045321; Date of filing of Application: Jul. 2, 2012; dated Jan. 10, 2013; 10 pages.

Active Learning for Natural Language Processing NAACL, ISBN 978-1-932432-40-4, Onipress Inc, Jun. 5 2009, 73 pages.

Alonso et al., "Crowdsourcing for Relevance Evaluation," ACM, V42, N2, Dec. 2008, 7 pages.

Biewald et al., "Ensuring quality in crowdsourced search relevance evaluation—the effects of training question distribution," SIGIR 10, Jul. 19-23, 2010, 4 pages.

(56) References Cited

OTHER PUBLICATIONS

Crowdflower Business Listing Verification, YouTube webpages, Jun. 29, 2011, http://www.youtube.com/watch?v=68qd5e4JTpY, 1 page.

Crowdflower, Youtube webpages, uploaded Mar. 30, 2010, http://www.youtube.com/watch?v=U4O8RYtcGc4, 4 pages.

Dawid et al., Maximum Likelihood Estimation of Observer Error-Rates Using the EM Algorithm, Journal of Royal Statistical Society Series C, V28, N1, Jan. 1, 1979, pp. 20-28.

Dredze Mark, Annotating Named Entities in Twitter Data with Crowdsourcing, Proceedings of the NAACL HL T, pp. 80-88, Jun. 2010.

Eckert et al., "Crowdsourcing the Assembly of Concept Hierarchies," ACM 978-1-4503-0085, Jun. 25, 2010, 10 pages.

Kazai Gabriella, "An Exploration of the Influence that Task Parameters have on the Performance of Crowds," Microsoft, Oct. 4, 2010, http://www.crowdconf2010.com/images/finalpapers/kazai/pdf, 9 pages.

Kern et al., "Statistical Quality Control for Human-Based Electronic Services," ICSOC 2010, LNCS 6470, pp. 243-257, Springer, Dec. 7-10, 2010, 10 pages.

Merge et al., "Using the Amazon Mechanical Turk for Transcription of Spoken Language," Carnegie Mellon University, Jan. 1, 2010, 5 pages.

Munro, "Crowdsourcing and language studies—the new generation of linguistic data," Los Angeles, CA, NAACL HLT, Jun. 6, 2010, 6 pages.

Oleson et al., "Programmatic Gold—Targeted and Scalable Quality Assurance in Crowdsourcing," AAAI Workshop 2011, pp. 43-48, Aug. 7-8, 2011.

Sheng et al., "Get another label-Improving data quality and data mining multiple," noisy labelers KDD Aug. 24-27, 2008, 9 pages.

Smucker et al, "The Crowd vs the Lab—A comparison of crowdsourced and University Laboratory Participant Behavior," SIGIR 2011, Jul. 2011, 6 pages.

International Search Report and Written Opinion for PCT/US2012/060659; Date of filing of Application: Oct. 17, 2012; dated Mar. 28, 2013; 12 pages.

Notice from the European Patent Office dated Oct. 1, 2007 concerning business methods.

Finin, Tim, et al., "Annotating Named Entities in Twitter Data with Crowdsourcing", Proceedings of the NAACL HLT, pp. 80-88, Jun. 2010 http://ebiquity.umbc.edu/_file_directory_/papers/483.pdf http://dl.acm.org/citation.cfm?id=1866709.

Le, John, et al., "Ensuring quality in crowdsourced search relevance evaluation—the effects of training question distribution", SIGIR 10, Jul. 19-23, 2010, 4 pages.

Leymann, F., et al., "Workflow-based applications", Nov. 1997, IBM IBM Systems Journal, vol. 36 (Year: 1997), 102-123.

Oleson, David, et al., "Programmatic Gold-Targeted and Scalable Quality Assurance in Crowdsourcing", AAAI Workshop 2011, pp. 43-48.

Schmidt, Lauren, "Crowdsourcing for Human Subjects Research", CrowdConf 2010, San Francisco Oct. 4, 2010 http://www.crowdsourcing.org/document/crowdsourcing-for-human-subjects-research/3002.

\* cited by examiner

Your Jobs > New

Add Data

Upload a Spreadsheet ⓘ

Supported formats: .csv, .tsv, .xls, .xlsx, .ods

[▭ 0%] (Upload File)

Examples
- Image moderation
- Data collection

Pull a Data Feed ⓘ

Supported formats: RSS, Atom, XML, JSON

[http://example.com/feed.rss] (Pull Data)

Quick Start
- Twitter search
- Google News search

Choose one of these if you want to begin exploring the Company interface now without having to create your own data set first.

Start Without Data

If you're sure that you want to start a job without data, you can do so by clicking the button below. This is usually only useful when creating survey jobs in which you don't have data and only need to collect opinions and information from workers without validating their input. If you just want to try out the Company interface, we suggest using one of the "Quick Start" items above.

(Create a Job With No Data)

Your Jobs > 9647 > Units

Job 9647
Not Ordered ▶

| Overview | Data | Edit | Gold | Analytics |

[Add Data] [Delete Data] [Split Column]    [Continue]

Processing your data...    Done!

To remove columns, select their column header and click "Continue". Looking for the job webhook? It can now be found under Advanced Options.

| unit_id | amount | country | external_type | finished_at | ip | started_at | subid | tainted |
|---|---|---|---|---|---|---|---|---|
| 13718867 | 0.3 | USA | trial_pay | 2010-03-11 17:39 | 9.18.24.137 | 2010-03-11 17: | 0 | f |
| 13718868 | 0.3 | USA | trial_pay | 2010-03-11 17:42 | 4.27.237.50 | 2010-03-11 17: | 0 | f |
| 13718869 | 0.3 | USA | trial_pay | 2010-03-11 18:06 | 5.184.149.5 | 2010-03-11 17: | 0 | f |
| 13718870 | 0.3 | USA | trial_pay | 2010-03-11 17:47 | 5.20.150.24 | 2010-03-11 17: | 0 | f |
| 13718871 | 0.3 | USA | trial_pay | 2010-03-11 17:46 | 6.177.249.1 | 2010-03-11 17: | 0 | f |
| 13718872 | 0.3 | USA | trial_pay | 2010-03-11 17:52 | 4.123.246.1 | 2010-03-11 17: | 0 | f |
| 13718873 | 0.3 | USA | trial_pay | 2010-03-11 18:19 | 8.243.138.12 | 2010-03-11 17: | 0 | f |
| 13718874 | 0.3 | USA | trial_pay | 2010-03-11 18:37 | 5.109.244.22 | 2010-03-11 17: | 0 | f |
| 13718875 | 0.3 | USA | trial_pay | 2010-03-11 18:27 | 1.86.210.44 | 2010-03-11 18: | 0 | f |
| 13718876 | 0.3 | IRL | trial_pay | 2010-03-11 22:1 | 86.40.19.35 | 2010-03-11 18: | 0 | f |
| 13718877 | 0.3 | GBR | trial_pay | 2010-03-11 18:39 | 5.146.142.2 | 2010-03-11 18: | 0 | f |
| 13718878 | 0.3 | MYS | trial_pay | 2010-03-11 18:26 | 0.54.59.179 | 2010-03-11 18: | 0 | f |

Your Jobs > 9647 > Calibrate

Calibrate Job 9647

Before ordering your job, we need to figure out how much money to pay workers to complete this job. We calculate this amount by determining how long your task takes to complete and then pricing this job so as to ensure that it pays well enough that workers will want to work on it. If the pricing is too low, it can take a long time for your job to complete or it may never get finished at all.

99.18.24.137 (USA)
Is this information correct?

○ Yes
○ No
○ Unknown

[Finished]

*FIG. 6*

Your Jobs > 9647 > Calibrate

Calibrate Job 9647

Time per unit
Recalibrate

[ 38 ] seconds

Worker wages
Cheaper jobs take longer to complete.

$ ———●——— $$$

Accuracy
More accurate results require more judgments per unit.

less ——●——— more

| | |
|---|---|
| Units needing judgments | 304 |
| Judgments per unit | 3 |
| Time to complete (estimated) | 5h 4m |
| Workers hourly pay (@ 38 secs per unit) | $2.00 |
| Total | $33.36 (11¢ per unit) |

( Next Step → )

Advanced settings

Your Jobs > 9647 > Order

Calibration Successful (Recalibrate)

You don't have any gold questions!

It looks like you haven't created any gold questions yet! Gold questions are the best way to ensure that you get good results. If you can't add gold (very subjective questions, etc.), we recommend that you use only the highest quality channels (below).

[ Define some gold ]  Close

Percentage to Order

⦿ 304 + 0 of 304 units will be ordered (100%) for $33.36

You can order a small percentage of your job if you want to check a small sample of judgments before ordering your entire job. A base charge for gold units is added to each order. 304 rows of data will be judged by 3 individual workers, each, for a total of 912 judgments.

Payment

You currently have $3.26 in your account. After placing this order, you will have $-30.10 left.

Choose Channels

| | | Speed | Quality | Cost |
|---|---|---|---|---|
| ⓘ | ☑ Amazon Mechanical Turk | ⚡⚡⚡ | ★★★ | $ $ $ |
| ⓘ | ☐ Crowdflower | ⚡ | ★ | $ |
| ⓘ | ☐ Gambit | ⚡⚡⚡⚡ | ★★ | $ $ $ |
| ⓘ | ☐ Give Work (iPhone app) | ⚡⚡⚡⚡ | ★★★★ | $ $ $ |

Your Jobs > 9647 > Golds > 13718905 > Edit

Dig Gold on Unit #13718905

Show job instructions  ☐ Dig randomly  [Skip]

| Gold | 0 Judgments | Gold Stats (0 golds) |

93.40.176.13 (ITA)

Is this information correct? (required)
Type: cml:radios  Validators: required ☑ Yes ☐ No ☐ Unknown Reason (Shown when worker misses this question)

Difficulty: [Super simple ▲▼]  [Save Gold]

|  | Progress 1 / 10 | Accuracy ? | Send Feedback |

This job will take approximately 30 minutes to complete
You must complete all 10 pages in this job to receive payment. We randomly insert test questions to help us check your accuracy. If your accuracy is too low, our system will have to discard your work and you will not receive payment. Don't worry, though! You can use the toolbar above to help you keep track of your accuracy and progress.

Tell us if this data is accurate (10 times)

Instructions Hide

Given an ip address verify that it is located in the country shown by searching the internet.

24.123.246.190 (USA)

Is this information correct? (required)
○ Yes
○ No
○ Unknown 67.235.68.165 (USA)

Is this information correct? (required)
○ Yes
○ No
○ Unknown

[ Submit Task ]

| Assignments Completed | 1 | Accuracy ? | Send Feedback |

Some of your answers weren't what we expected.

Your estimated accuracy is 0.00%, which is lower than the average of 90% for this job.

Here are some recent questions you've missed:

93.40.176.13 (ITA)

Is this information correct? (required)

○ Yes
○ No
○ Unknown

For the question titled "Is this information correct?" you answered: "No" but the correct answer was: "Yes".

The reason for this is: "This is indeed an italian IP ipaddress as verified by searching the web."

If you believe that this test question is unfair or incorrect, please let us know below. We'll review these items for fairness and accuracy.

⦿ That's ok
○ This test question is unfair or incorrect!

Review Instructions

Limited Time Offers

Participate in one of our special offers and earn guaranteed Swag Bucks. Sign up (and credit card information) may be required. Sign up only for the offers that interest you, suspicious activity may result in account suspension.

| Wall 1 (By Gambit) | Wall 2 (By OfferPal) | Wall 3 (By TrialPay) | Wall 4 (By Paymentwall) (New) |

Complete these offers and earn Swag Bucks!

| all | free | tasks | offer status |

Tasks available

Currently active on gambit: [10706, 10922, 10933, 10693, 11002, 11044, 10945, 11101, 11078]

99
available
18 Swag Bucks

Help us find the correct website and name for 3 businesses. [NEW JOB, MORE PAY!] [ping gambit]
In this task, you will verify and fix the website address and name for businesses. Use the information we've supplied as well as the links that open a search for the business name, city, and state to help you determine if the website is the correct and official website for that business.

131
available
15 Swag Bucks

Check the Prices of Vacations [ping gambit]
In this job, you will be looking at vacation packages and verifying the price. Each question will have additional information helping you to identify the correct price, so be sure to read each question carefully. If there are multiple pricing tiers for a trip, you should try to find the least expensive pricing of the itinerary that matches the additional information provided.

132
available
3 Swag Bucks

Tell us about yourself [ping gambit]
We are doing an experiment to learn more about who you are, what you do, and why you do these online tasks. Your responses are extremely valuable to us so please take the time to answer them as accurately as possible. We really appreciate your responses. Thank you.

*FIG. 13A*

Limited Time Offers

Participate in one of our special offers and earn guaranteed Swag Bucks. Sign up (and credit card information) may be required. Sign up only for the offers that interest you, suspicious activity may result in account suspension.

| Wall 1 (By Gambit) | Wall 2 (By OfferPal) | Wall 3 (By TrialPay) | Wall 4 (By Paymentwall) |

Complete these offers and earn Swag Bucks!

| all | free | tasks | offer status |

| Progress 1/10 | Accuracy ? | Give Up | Send Feedback |

This job will take approximately 30 minutes to complete

You must complete all 10 pages in this job to receive payment. We randomly insert test questions to help us check your accuracy. If your accuracy is too low, our system will have to discard your work and you will not receive payment. Don't worry, though! You can use the toolbar above to help you keep track of your accuracy and progress.

Please answer the questions carefully. If you drop below 70% accuracy we will NOT pay you for this task. If you answer correctly, it's easy points!

You are in training mode.

This Task will not be submitted until you have correctly answered 4 items below. You have gotten 0 items correct thus far. When you miss an item we will explain why. Once you have gotten 4 more item correct this Task will be submitted and you can continue normally.

Check the Prices of Vacations (10 times)

Instructions Hide

In this job, you will be looking at vacation packages and verifying the price. Each question will have additional information helping you to identify the correct price, so be sure to read each question carefully. If there are multiple pricing tiers for a trip, you should try to find the least expensive pricing of the itinerary that matches the additional information provided.

Limited Time Offers

Participate in one of our special offers and earn guaranteed Swag Bucks. Sign up (and credit card information) may be required. Sign up only for the offers that interest you, suspicious activity may result in account suspension.

| Wall 1 (By Gambit) | Wall 2 (By OfferPal) | Wall 3 (By TrialPay) | Wall 4 (By Paymentwall) (New) |

Complete these offers and earn Swag Bucks!

| all | free | tasks | offer status |

Andalucia
provided by Classic Journeys
Trip Duration: 7 Days and 6 Nights
Departing: 06/06/10

Click here to learn more about this trip.

Can you find pricing information for trips departing on 06/06/10? (required)
○ Yes, there is a trip departing on this date
○ No, there is no pricing info for trips departing on this date

Price for 'Tour Price' of USD 3795 (required)
○ Yes, this is correct
○ No, this is incorrect
○ I can't find a price for 'Tour Price'

Price for 'Single supplement' of USD 595 (required)
○ Yes, this is correct
○ No, this is incorrect
○ I can't find a price for 'Single supplement'

Any comments?

DISTRIBUTING A TASK TO MULTIPLE WORKERS OVER A NETWORK FOR COMPLETION WHILE PROVIDING QUALITY CONTROL

TECHNICAL FIELD

This technology relates generally to outsourcing or crowd sourcing jobs or other tasks while providing quality control.

BACKGROUND

Outsourcing mundane tasks and jobs to online labor around the globe has demonstrated potential in assisting entities and individuals complete a large amount of tasks in a time efficient manner. However, given the variability in labor pool, education level, age group, the results of the completed tasks are frequently less than ideal. Although entities could utilize crowd sourcing to have tasks completed in a short amount of time for a reasonable cost, the quality is typically highly variable and frequently unreliable.

BRIEF DESCRIPTION OF THE DRAWINGS

FIG. 3 illustrates a screenshot showing an example user interface which can be used by an entity or user to request to submit tasks requested to be completed by multiple workers.

FIG. 4 illustrates a screenshot showing an example user interface used by an entity or user to manage task and job listings.

FIG. 5 illustrates a screenshot showing an example user interface used by an entity or user edit tasks or unit jobs to be completed by distributed workers.

FIG. 6 illustrates a screenshot showing an example prompt used to determine attributes of the task needed to set a wage for workers completing a unit job of the task.

FIG. 7 illustrates a screenshot showing an example user interface for an entity or user to calibrate a job.

FIG. 8 illustrates a screenshot showing an example user interface for an entity or user to define gold questions and to order jobs/tasks to be completed.

FIG. 9 illustrates a screenshot showing an example user interface for an entity or user to select or specify unit jobs used by the system to calibrate or control quality.

FIG. 11 illustrates a screenshot showing an example user interface for a worker (e.g., on demand labor force) to access a unit job in a task that is distributed to multiple workers for completion.

FIG. 12 illustrates a screenshot depicting an example user interface showing a worker the results of the unit job that was performed.

FIG. 13A illustrates a screenshot depicting an example user interface where unit jobs in a task are distributed to garners or users on a web-based gaming environment.

FIG. 13B-C illustrate example user interfaces where a gamer can perform a unit job in exchange for virtual currency.

DETAILED DESCRIPTION

Figure 1:
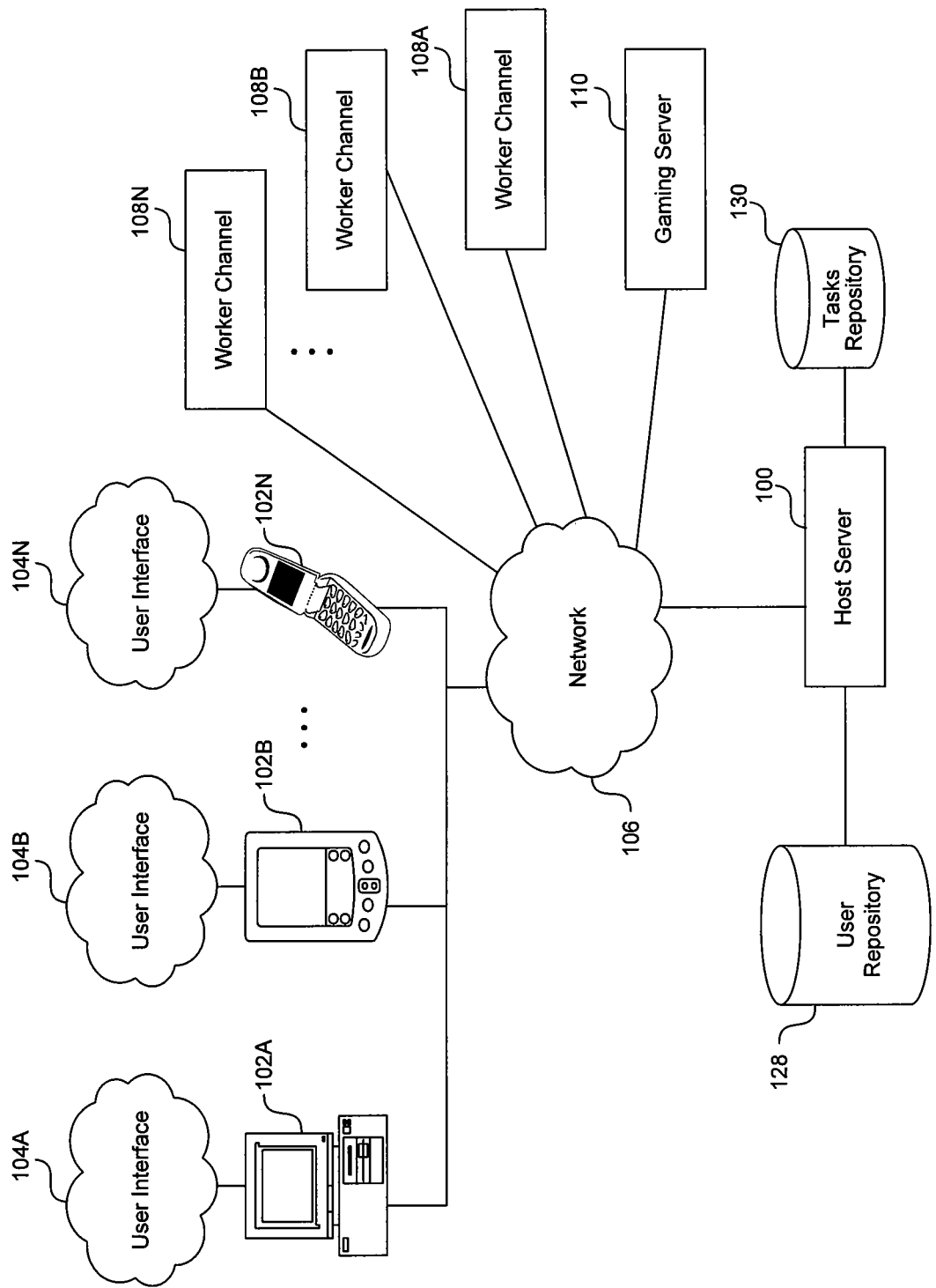
FIG. 1 illustrates an example block diagram of a host server that performs crowd sourcing by distributing tasks over a network to multiple workers for completion while also providing quality control and quality standard setting features.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for providing crowd sourcing services with quality control mechanisms.

FIG. 1 illustrates an example block diagram of a host server 100 that performs crowd sourcing by distributing tasks over a network 106 to multiple workers for completion while also providing quality control and quality standard setting features.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100. For example, the client devices 102A-N can be any of, but are not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, and/or an iPhone, etc. In one embodiment, the client devices 102A-N and content providers 108A-N of electronic content are coupled to a network 106. In some embodiments, the devices 102A-N and host server 100 may be directly connected to one another.

In one embodiment, the host server 100 is operable to perform crowd sourcing services and/or to process crowd sourcing requests for entities (e.g., companies, organizations or other types of institutions) or users (e.g., individual or groups of users). The host server 100 can distribute a task to be crowd sourced to multiple workers (who may be located through various different channels 108A-N) and provide quality control mechanisms. The worker pool can be selected manually by the person posting the task. Some pools have limitations, for example, some don't allow adult content, others don't provide the cultural or language needs of the task.

Quality control and the amount of quality desired can be configured by the requesting entity or user such that for example, a user or entity is only charged for the task if completed to the desired or target accuracy level. The channels 110 through which labor can be identified can include by way of example but not limitation, Amazon Mechanical Turk, Gambit (e.g., a third party gaming platform), Give Work, SamaSource, Trial Pay (e.g., a virtual currency provider), Gambit, Internal, etc. New and additional labor forces are constantly being integrated into the system, each with their own advantages and disadvantages.

In some instances, the host server 100 utilizes an online gaming platform (e.g., through a third-party gaming server 110) through which to distribute tasks or unit jobs in tasks. Note that the host server 100 may also host gaming services via one or more gaming platforms. The unit jobs can be distributed to garners or other visitors on the gaming platform. In one embodiment, the workers utilized in an online game can be paid in virtual currency, such as virtual currency that can be used to play games on the gaming server 110.

Figure 2:
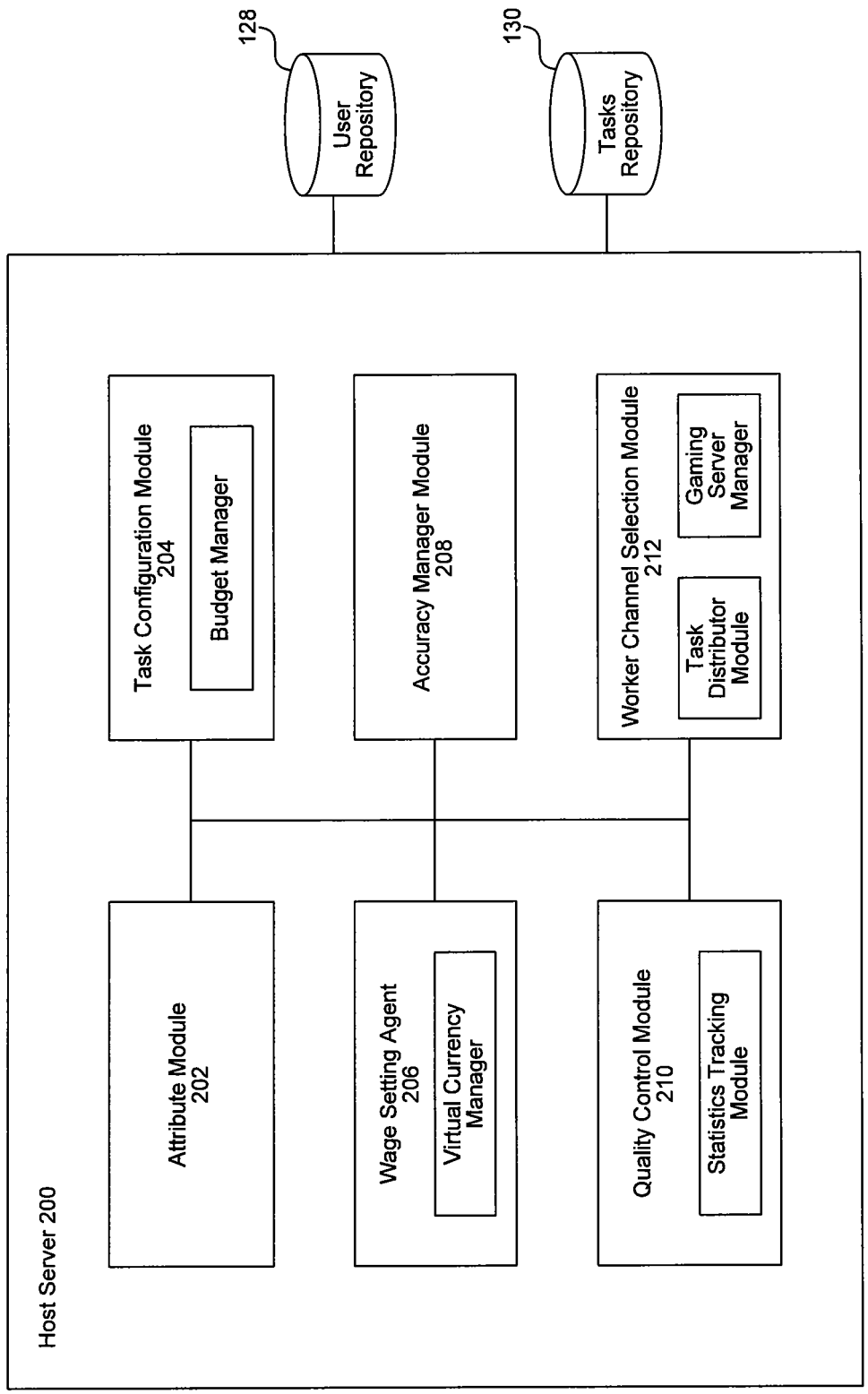
FIG. 2 depicts an example block diagram of the components of a host server that performs the techniques for distributing a task over a network to multiple workers for completion with quality control.

Functions and techniques performed by the host server 100 and the components therein are described in detail with further references to the examples of FIG. 2.

The client devices 102A-N are generally operated by entities/users requesting crowd sourcing services, for example via user interface 104A-N displayed on the display units. The client devices may also be. The client devices 102A-N may also be used (e.g., by programmers and developers) by workers to access job units or tasks for completion.

The network 106, over which the client devices 102A-N and the host server 100 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but are not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128 and/or a tasks repository 130. The repositories can store software, descriptive data, images, system information, drivers, and/or any other, data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., Concept-Base, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the tasks repository 130 and/or can retrieve data stored in the repositories. The user repository 128 can store user (e.g., worker) information, statistics, speed, accuracy, topics of interest, topics of expertise, etc.

The tasks repository 130 can include, tasks or unit jobs (e.g., in spreadsheets or other types of files) specified by entities or individuals requesting crowd sourcing services. The respository 130 can also include information about the requesting entities or individuals.

FIG. 2 depicts an example block diagram of the components of a host server 200 that performs the techniques for distributing a task over a network to multiple workers for completion with quality control.

One embodiment of the host server 200 includes an attribute module 202. The attribute module 202 can be any combination of software agents and/or hardware modules (e.g., including processors and/or memory units) able to identify, detect, extract, an attribute of a task, which generally includes multiple units.

An attribute of a task can include, by way of example but not limitation, level of difficulty of the task, level of subjectivity, etc. Task attributes can be specified or measured by an amount of time that is needed to complete the task. In addition, the attribute can include determining target accuracy specified by the entity or user requesting the crowd sourcing services.

Task attributes can be determined during a calibration process when the requesting entity is setting up jobs or tasks to be distributed to on-demand labor for completion. For example, the screenshots in the examples of FIG. 6-FIG. 7 depict a calibration process whereby timing, wages, and accuracy are determined and computed for a unit job or task.

One embodiment of the host server 200 includes a task configuration module 204. The task configuration module 204 can be any combination of software agents and/or hardware modules (e.g., including processors and/or memory units) able to configure a task or unit jobs for quality control and based on a user's specified parameters.

Figure 5:
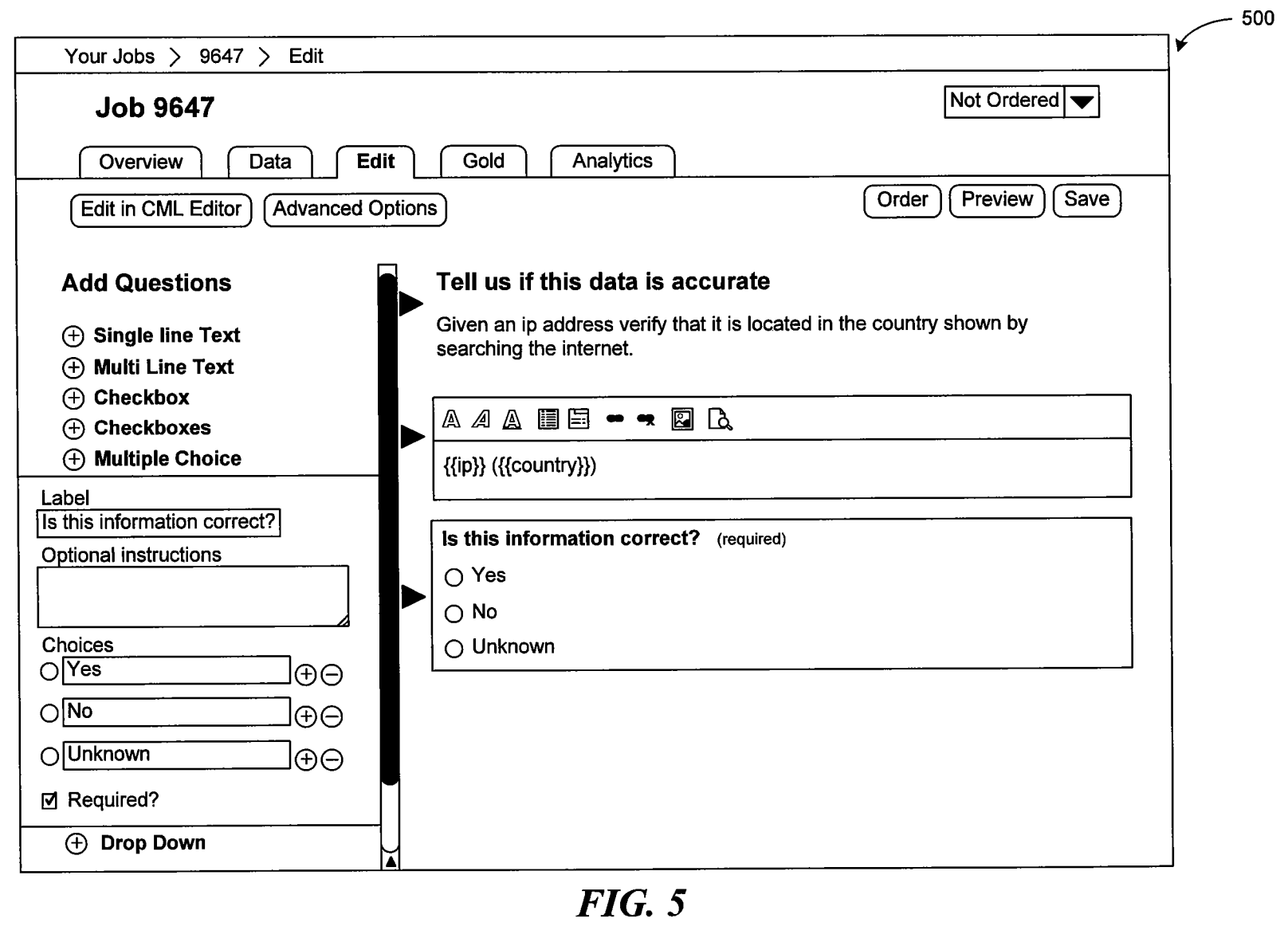

For example, the task configuration module 204 allows the user to upload or edit tasks/unit jobs via a web interface, as shown in the examples of FIG. 4-5. In addition, the task configuration module 204 calibrates a task by identifying its attributes or attributes of a single unit job. For example, in the screenshot in FIG. 6, the task configuration module 204 determines the amount of time needed a certain unit job or task requires. This information can be used to determine the wage to pay a worker when they have completed their jobs, for example, by the wage setting agent 206.

One embodiment of the host server 200 includes a wage setting agent 206. The wage setting agent 206 can be any combination of software agents and/or hardware modules (e.g., including processors and/or memory units) able to set a wage amount that is offered to a worker for completing a unit job of the task based on the attribute and the target accuracy.

In general, the wage setting agent 206 can set the wage based on one or more the attributes, level of target accuracy, the requestor's budget, etc. In addition, the requesting entity/user can specify a desired level of wage to pay each worker. In one embodiment, the system sets the wage dynamically. For example, the initial calibration of the wage can be an estimate and the actual wage is calculated as the job progresses. The system can continue to track the amount of time/resources need by workers to complete a job. This way, the system can compensate for jobs that are taking workers different amounts of time from what was originally estimated. In general, most jobs end up around $2/hr, but jobs that are extremely time sensitive can be much higher (e.g., as much as $15/hr). There is also a direct correlation between quality of the work and payment amount. Using the wage amount, the agent 206 can also determine the total cost to the requesting entity to complete the task using the total number of job units in the task. The wage setting agent 206 is configured such that the requestor (entity or user) can tweak the total cost by adjusting, one or more of, the target level of accuracy and the desired/ideal level of wage for paying the workers.

One embodiment of the host server 200 includes an accuracy manager module 208. The accuracy manager module 208 be any combination of software agents and/or hardware modules (e.g., including processors and/or memory units) able to determine, set, identify, the target accuracy in completion of the task by the entity.

The target accuracy can be, for example, specified by the entity/user requesting that a task be distributed to multiple workers (e.g., including online labor, on-demand labor) for completion. The target accuracy can be specified during calibration, for example, as illustrated in the example user interface of FIG. 7. The user/entity and indicate whether more or less accuracy is desired. Generally more accurate results require additional results to be obtained per job unit, thus potentially increasing the total cost to complete the task. In some instances, the target accuracy may be set by default rather than user customized.

One embodiment of the host server 200 includes a quality control module 210. The quality control module 210 can be any combination of software agents and/or hardware modules (e.g., including processors and/or memory units) able to implement quality control mechanisms to ensure that the results of the completion of the task are of a quality expected by the requestor.

The quality control module 210 can compute the number of results (e.g., judgments) needed per job unit based on the target accuracy. To computer the number of results, in one embodiment, a minimum number of judgments is initially set. If the measure of agreement is below a predefined percentage once the minimum number of judgments has been collected, more judgments can be collected until the predefined agreement has been met. A maximum number of judgments can also be set, for example to ensure jobs run within budget.

In addition, the quality control module 210 can manage the standards for each task used for quality control. For example, the quality control module 210 enables the requesting entity/user to specify a select set of unit jobs that are presented to online labor units for the entity to evaluate quality of task completion. The questions can be added, for example, as illustrated in the user interface of FIG. 8. In general, the types of tasks that are good for the quality control are those with a right or wrong answer.

For these questions, the correct answers or responses are typically specified, as shown, in the example of FIG. 9. The user/entity can also monitor/track the efficacy of the selected questions. For example, in the user interface 1000 of example FIG. 10, the user can see each selected question and whether workers have correctly answered these questions. In user interface 1000, the user can also see, access, and/or track how many workers have responded to a selected question. Using the statistics, the user can modify the selection accordingly.

Using these questions, the quality control module 210 can determine the quality of the work and the quality of a particular worker's work product. For example, the quality control module 210 may include a statistics tracking module which tracks, collects and/or aggregates statistics of the online labor units completing the select jobs. In most instances, workers are able to choose any job that has been as long they meet certain requirements (e.g., age and/or language, etc.). However, workers can also be prohibited from working on a single job, single type of job, or all jobs. For example, workers history, statistics, and performance, can be used to target jobs to workers based on what they have performed well on. Workers are typically allowed to attempt any job they haven't been blocked from. If it's the first time they have seen the task they will only be asked known questions. If they have not answered a pre-defined number of questions correctly within a certain time period they are typically not allowed to perform the actual task.

One embodiment of the host server 200 includes a worker selection module 212. The worker selection module 212 can be any combination of software agents and/or hardware modules (e.g., including processors and/or memory units) able to select workers (e.g., online workers, on-demand labor, etc.) to whom to distribute unit jobs of a task.

The worker selection module 212 can select a channel based on the user/entity's selection (e.g., Mechanical Turk, Crowdflower, Gambit (e.g., a third party gaming platform), Give Work, SamaSource, Trial Pay (e.g., a virtual currency provider), Gambit, Internal, etc.). New and additional labor forces are constantly being integrated into the system, each with their own advantages and disadvantages. Based on the selected channel, the task distributor can then distribute jobs to various workers for completion of unit jobs in the task.

In one embodiment, the selected channel is an online gaming environment in which garners or other users are presented with unit jobs while playing game or doing something else. These users can be paid in virtual currency, for example, that they can use in the online gaming environment, as illustrated in the example of FIG. 13A-C. Such a process can be performed by the gaming service manager. The gaming server manager can manage games internal to the host server 200 or manage communications with an external gaming server (e.g., the gaming server 110 shown in the example of FIG. 1). The tasks can be presented on a site hosted by the server 200 of presented to workers on the third party site.

In one embodiment, the gaming server manager in the worker channel selection module 212 communicates with the wage setting agent 206 to determine the wage that a worker/gamer would be entitled to upon completion a unit job or task. The gaming server manager can then determine the amount of virtual currency to which the wage converts. The gaming server manager then communicate the tasks to be presented via the gaming site to the third party gaming server.

The host server 200 represents any one or a portion of the functions described for the modules. The host server 200 can include additional or less modules. More or less functions can be included, in whole or in part, without deviating from the novel art of the disclosure. The repositories 128 and 130 were discussed in conjunction with the description of FIG. 1.

FIG. 3 illustrates a screenshot showing an example user interface 300 which can be used by an entity or user to request to submit tasks requested to be completed by multiple workers. FIG. 4 illustrates a screenshot 400 showing an example user interface used by an entity or user to manage task and job listings. FIG. 5 illustrates a screenshot showing an example user interface 500 used by an entity or user edit tasks or unit jobs to be completed by distributed workers. FIG. 6 illustrates a screenshot showing an example prompt 600 used to determine attributes of the task needed to set a wage for workers completing a unit job of the task.

Figure 10:
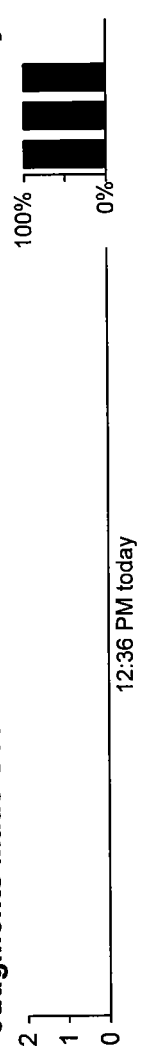
FIG. 10 illustrates a screenshot showing an example user interface for an entity or user to view or access statistics on worker results/responses to unit jobs or tasks. The statistics include, for example, one or more of, speed, accuracy, and answer distribution. For instance, since generally workers trying to beat or game the system will give the same answer over and over again. By looking at a distribution of a workers answers and comparing it against the distribution of a dataset to have, worker quality can be assessed or determined.

FIG. 7 illustrates a screenshot showing an example user interface 700 for an entity or user to calibrate a job. FIG. 8 illustrates a screenshot showing an example user interface 800 for an entity or user to define gold questions and to order jobs/tasks to be completed. FIG. 9 illustrates a screenshot showing an example user interface 900 for an entity or user to select or specify unit jobs used by the system to calibrate or control quality. FIG. 10 illustrates a screenshot showing an example user interface 1000 for an entity or user to view or access statistics on worker results/responses to unit jobs or tasks.

FIG. 11 illustrates a screenshot showing an example user interface 1100 for a worker (e.g., on demand labor force) to access a unit job in a task that is distributed to multiple workers for completion. FIG. 12 illustrates a screenshot depicting an example user interface 1200 showing a worker the results of the unit job that was performed.

FIG. 13A illustrates a screenshot depicting an example user interface 1300 where unit jobs in a task are distributed to garners or users on a web-based gaming environment. FIG. 13B-C illustrate example user interfaces where a gamer can perform a unit job in exchange for virtual currency.

Figure 14:
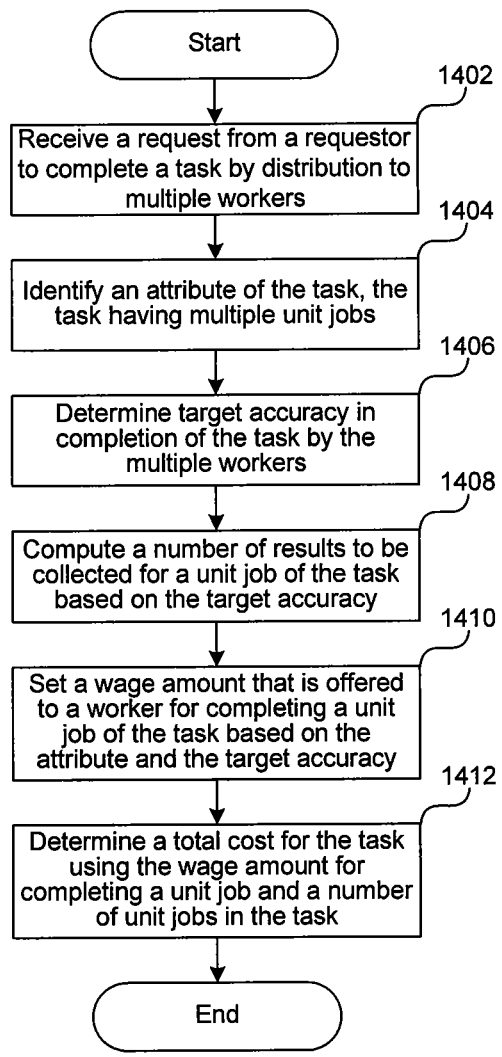
FIG. 14 depicts a flow chart illustrating an example process performed when a request to complete a task via crowd sourcing is received.

FIG. 14 depicts a flow chart illustrating an example process performed when a request to complete a task via crowd sourcing is received.

In process 1402, a request is received from a requestor to complete a task by distribution to multiple workers. The task typically has multiple unit jobs. The requestor can initiate a request to complete the task at a user device, for example, by uploading a spreadsheet specifying the tasks via a web interface. In most instances, physical locations of the multiple workers can be geographically distributed.

In process 1404, an attribute of the task is identified, for example via calibration, which can include, determining an amount of time elapsed to complete the task, determining a desired level of wage selected by the requestor, and/or determining target accuracy specified by the requestor.

In process 1406, target accuracy in completion of the task by the multiple workers is determined. In process 1408, a number of results to be collected for a unit job of the task are computed based on the target accuracy. In process 1410, a wage amount that is offered to a worker for completing a unit job of the task is set based on the attribute and the target accuracy. In general, the requestor can tweak the total cost by adjusting the target accuracy and/or the desired level of wage. In one embodiment, through a web interface, the requestor selects a worker channel through which the task is distributed. In addition, the requestor can be provided with speed and quality rankings of each of the worker channels.

In process 1412, a total cost for the task is determined using the wage amount for completing a unit job and a number of unit jobs in the task.

Figure 15:
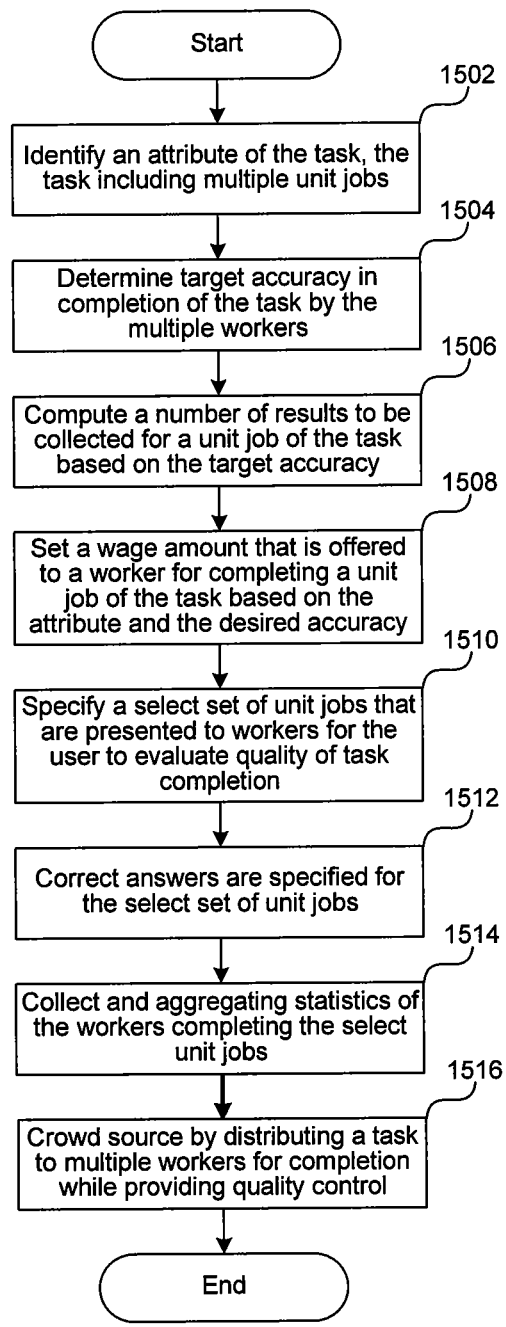
FIG. 15 depicts a flow chart illustrating an example process for providing quality control with task distribution to multiple workers.

FIG. 15 depicts a flow chart illustrating an example process for providing quality control with task distribution to multiple workers.

In process 1504, an attribute of the task is identified. The task typically has multiple unit jobs. The task can relate to, by way of example but not limitation, data collection, content moderation, image moderation, content verification, determining relevance of search results, etc. Additional tasks that can be sourced include, for example, sentiment analysis, entity similarity (products on an ecommerce site, or resumes on a job board), online research, unstructured content extraction, physical verification (go to a location and take a picture to verify a business is still located their), media tagging (adding meta information to video, images or sound).

In process 1506, target accuracy in completion of the task by the multiple workers (e.g., on-demand labor) is determined. The task can be distributed to the multiple workers over a network in communication with their respective computing devices. In process 1508, a number of results to be collected for a unit job of the task is computed based on the target accuracy. In process 1510, a wage amount (e.g, which may be real or virtual currency) that is offered to a worker for completing a unit job of the task is set based on the attribute and the desired accuracy.

In process 1512, a select set of unit jobs that are presented to workers for the user to evaluate quality of task completion are specified. In process 1514, the correct answers are specified for the select set of unit jobs. In process 1516, statistics of the workers completing the select unit jobs are collected and aggregated. The statistics can include, for example, one or more of, speed, accuracy, and answer distribution. In process 1518, task is crowd sourced.

Figure 16:
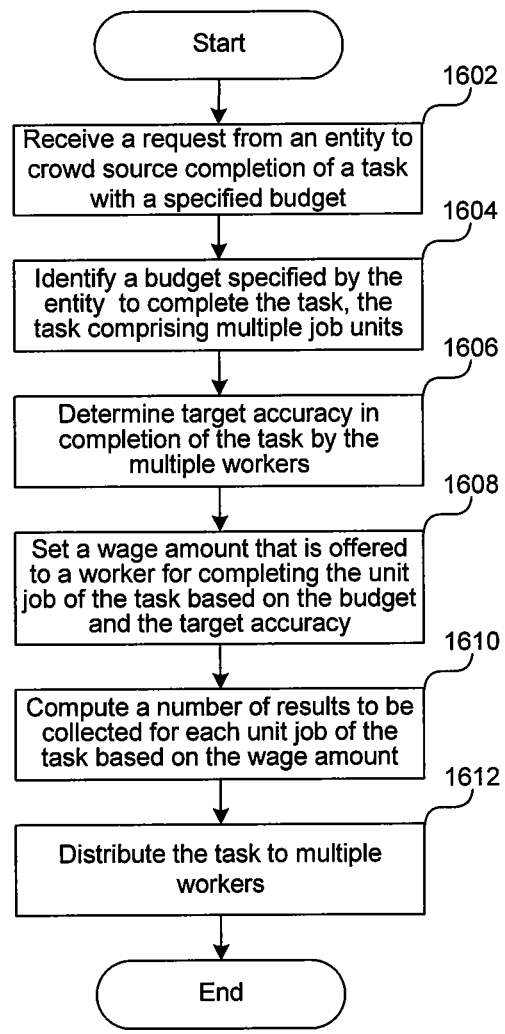
FIG. 16 depicts a flow chart illustrating an example process for completing a task within a specified budget via crowd sourcing.

FIG. 16 depicts a flow chart illustrating an example process for completing a task within a specified budget via crowd sourcing.

In process 1602, a request from an entity to crowd source completion of a task with a specified budget is received. In process 1604, a budget specified by the entity to complete the task is identified. In process 1606, target accuracy in completion of the task by the multiple workers is determined. In process 1608, a wage amount that is offered to a worker for completing the unit job of the task is set based on the budget and the target accuracy.

In process 1610, a number of results to be collected for each unit job of the task is computed based on the wage amount. In process 1612, the task is distributed to multiple workers.

Figure 17:
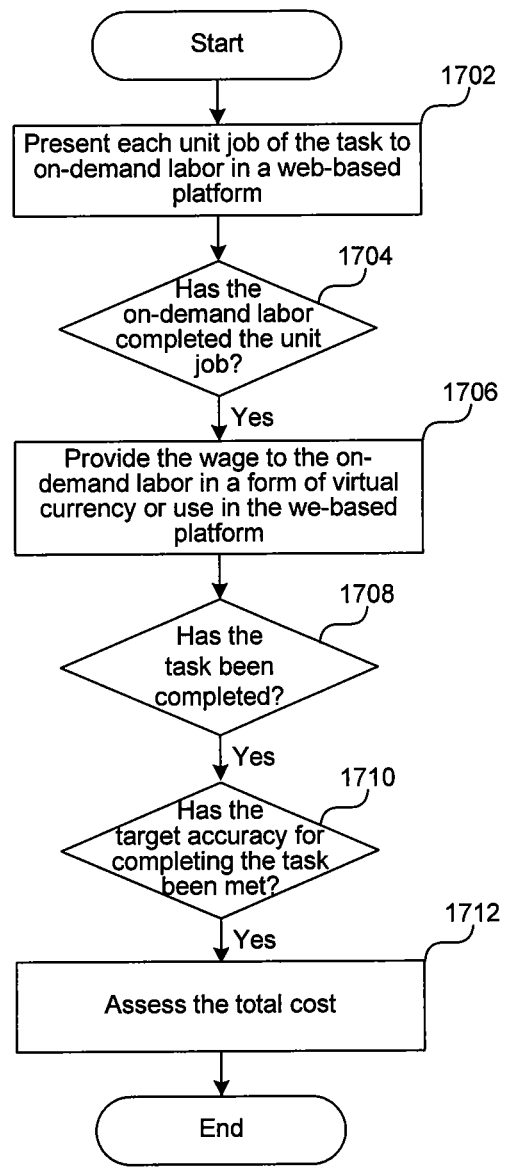
FIG. 17 depicts a flow chart illustrating an example process for completing a task within a specified budget via crowd sourcing.

FIG. 17 depicts a flow chart illustrating an example process for completing a task within a specified budget via crowd sourcing. In process 1702, each unit job of the task is distributed to on-demand labor in a web-based platform. Each unit job can be distributed for an entity over a network for completion by on-demand labor, for example, using their respective computing devices. In one embodiment, the web-based platform includes a web-based gaming environment and the on-demand labor includes online gamer or other web browsers in the web-based gaming environment. The web-based gaming environment may be system hosted or hosted by a third-party, as illustrated in the examples of FIG. 13A-C. Typically, the web-based gaming environment is a worker channel selected by the entity through which to distribute the task.

Note that the unit job can be presented to a gamer when the on-demand labor has depleted credits, presented on demand by request of the on-demand labor, or presented to the on-demand labor between gaming sessions.

In process 1704, it is determined whether the on-demand labor (e.g., online gamer) has completed the unit job. If so, in process 1706, the wage is provided to the on-demand labor in a form of virtual currency for use (e.g., as credit) in the web-based platform, as shown, in the example of FIG. 13C, where workers (e.g., garners) can complete some questions/offers in exchange for "Swag Bucks".

In some instances, the online workers are of a demographic which has an affinity for participating in online games. The online workers may be individuals unable to obtain credit to purchase virtual currency in the web-based gaming environment, for example, younger individuals who do not have access or credit, bank account, or credit cards, for example.

In process 1708, it is determined whether the task has been completed. If so, in process 1710, it is further determined whether the target accuracy has been met. If so, in process 1712, the total cost is assessed from the requesting entity/user.

Figure 18:
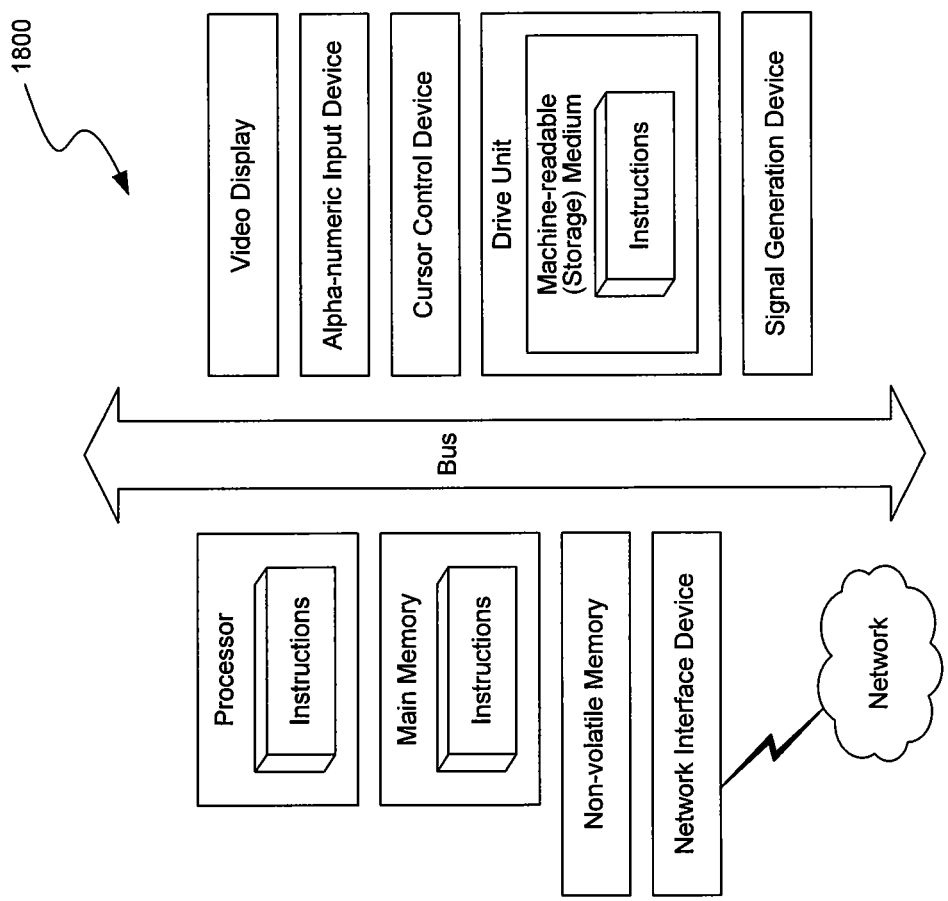
FIG. 18 shows a diagrammatic representation of a machine in the example form of a computer system within which a set of instructions, for causing the machine to perform any one or more of the methodologies discussed herein, may be executed.

FIG. 18 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A non-transitory machine-readable storage medium having a set of instructions stored thereon that, when executed, causes a processor to:
   identify a target accuracy for completion of a unit job of a task, the task including multiple unit jobs;
   retrieve a set of statistics for multiple workers across multiple crowdsourcing systems connected via a computer network, wherein the set of statistics include characteristics of previous responses for previous tasks performed by the multiple workers on the multiple crowdsourcing systems;
   set, for each tool of the subset of tools, a wage value for completion of each unit job of the task based on the target accuracy and based on a total wage value for completion of the task;
   determine a number of results to be obtained for the unit job of the task based on the target accuracy, wherein said determine includes:
      obtain, for each unit job of the task, a minimum number of results and a maximum number of results for completing the unit job of the task, the maximum number of results indicative of the maximum number of results capable of being performed at the wage value for completion of each unit job of the task without exceeding the total wage value for completion of the task;
      responsive to determining that a determined number of results is below the minimum number of results or greater than the maximum number of results, modify, for each unit job, the number of results for the unit job of the task until the number of results both exceeds the minimum number of results and falls below the maximum number of results;

obtain a selection, for the unit job of the task, of a subset of the multiple workers across the multiple crowdsourcing systems to generate a number of responses to the unit job based on the set of statistics, wherein a number of workers included in the selected subset of the multiple workers corresponds to the determined number of results;

transmit a request over the computer network to each of the subset of the multiple workers via the multiple crowdsourcing systems, wherein each of the subset of the multiple workers are configured to perform the unit job on a corresponding crowdsourcing system of the multiple crowdsourcing systems;

receive a response from each of the subset of workers that includes the response to the unit job over the computer network via the multiple crowdsourcing systems;

process each received response to derive an accuracy value of each received response based on a similarity of each response to other received responses;

responsive to determining that each received response from the subset of workers exceeds the target accuracy, distribute wage resources to the set of workers based on the set wage value associated with each of the subset of workers and the total wage value for completion of the task; and update the set of statistics relating to each of the subset of workers based on the derived accuracy value of the received response provided by each of the subset of workers.

2. The non-transitory machine-readable storage medium of claim 1, wherein the set of statistics include, one or more of, speed, accuracy, and answer distribution.

3. The non-transitory machine-readable storage medium of claim 1, wherein, the multiple workers include on-demand labor.

4. A system for selectively distributing unit jobs of a task for completion by selected workers, the system comprising:

means for identifying a target accuracy for completion of a unit job of a task, the task including multiple unit jobs;

means for retrieving a set of statistics for multiple workers across multiple crowdsourcing systems connected via a computer network, wherein the set of statistics include characteristics of previous responses for previous tasks performed by the multiple workers on the multiple crowdsourcing systems;

means for setting, for each tool of the subset of tools, a wage value for completion of each unit job of the task based on the target accuracy and based on a total wage value for completion of the task;

means for determining a number of results to be obtained for the unit job of the task based on the target accuracy, wherein said determining includes:

means for obtaining, for each unit job of the task, a minimum number of results and a maximum number of results for completing the unit job of the task, the maximum number of results indicative of the maximum number of results capable of being performed at the wage value for completion of each unit job of the task without exceeding the total wage value for completion of the task;

responsive to determining that a determined number of results is below the minimum number of results or greater than the maximum number of results, means for modifying, for each unit job, the number of results for the unit job of the task until the number of results both exceeds the minimum number of results and falls below the maximum number of results;

means for obtaining a selection, for the unit job of the task, of a subset of the multiple workers across the multiple crowdsourcing systems to generate a number of responses to the unit job based on the set of statistics, wherein a number of workers included in the selected subset of the multiple workers corresponds to the determined number of results;

means for transmitting a request over the computer network to each of the subset of the multiple workers via the multiple crowdsourcing systems, wherein each of the subset of the multiple workers are configured to perform the unit job on a corresponding crowdsourcing system of the multiple crowdsourcing systems;

means for receiving a response from each of the subset of workers that includes the response to the unit job over the computer network via the multiple crowdsourcing systems;

means for processing each received response to derive an accuracy value of each received response based on a similarity of each response to other received responses;

responsive to determining that each received response from the subset of workers exceeds the target accuracy, means for distributing wage resources to the set of workers based on the set wage value associated with each of the subset of workers and the total wage value for completion of the task; and means for updating the set of statistics relating to each of the subset of workers based on the derived accuracy value of the received response provided by each of the subset of workers.

5. The non-transitory machine-readable storage medium of claim 1, wherein the set of instructions further cause the processor to:

present an interface including a first calibration slider allowing for modification of the set wage value associated with each of the subset of workers and/or the total wage value for completion of the task, modification of the target accuracy for completion of the task, and a time of completion of each unit job of the task.

6. A method comprising:

Identifying, by a server, a target accuracy for completion of a unit job of a task, the task including multiple unit jobs;

retrieving, by the server, a set of statistics for multiple workers across multiple crowdsourcing systems connected via a computer network, wherein the set of statistics include characteristics of previous responses for previous tasks performed by the multiple workers on the multiple crowdsourcing systems;

setting, by the server, for each tool of the subset of tools, a wage value for completion of each unit job of the task based on the target accuracy and based on a total wage value for completion of the task;

determining, by the server, a number of results to be obtained for the unit job of the task based on the target accuracy, wherein said determining includes:

obtaining, by the server, for each unit job of the task, a minimum number of results and a maximum number of results for completing the unit job of the task, the maximum number of results indicative of the maximum number of results capable of being performed at the wage value for completion of each unit job of the task without exceeding the total wage value for completion of the task;

responsive to determining that a determined number of results is below the minimum number of results or greater than the maximum number of results, modifying, by the server, for each unit job, the number of results for the unit job of the task until the number of results both exceeds the minimum number of results and falls below the maximum number of results;

obtaining, by the server, a selection, for the unit job of the task, of a subset of the multiple workers across the multiple crowdsourcing systems to generate a number of responses to the unit job based on the set of statistics, wherein a number of workers included in the selected subset of the multiple workers corresponds to the determined number of results;

transmitting, by the server, a request over the computer network to each of the subset of the multiple workers via the multiple crowdsourcing systems, wherein each of the subset of the multiple workers are configured to perform the unit job on a corresponding crowdsourcing system of the multiple crowdsourcing systems;

receiving, by the server, a response from each of the subset of workers that includes the response to the unit job over the computer network via the multiple crowdsourcing systems;

processing, by the server, each received response to derive an accuracy value of each received response based on a similarity of each response to other received responses; and responsive to determining that each received response from the subset of workers exceeds the target accuracy, distributing, by the server, wage resources to the set of workers based on the set wage value associated with each of the subset of workers and the total wage value for completion of the task.

7. The method of claim 6, further comprising, distributing the task to multiple workers.

8. The method of claim 6, further comprising, in response to determining that the task has been completed and that the target accuracy has been met, assessing the total cost from a requestor.

9. The method of claim 6, wherein, the task is distributed to the multiple workers over a network in communication with their respective computing devices.

10. The method of claim 6, wherein, through a web interface, the entity selects a worker channel through which the task is distributed.

11. The method of claim 6, wherein, the worker channel comprises a web-based social gaming environment.

12. The method of claim 6, wherein, the wage is in a form or real currency.

13. The method of claim 6, wherein, the wage is in a form of virtual currency.

14. The method of claim 6, wherein, the wage is set dynamically and adjustable.

15. A method comprising:
Identifying, by a processor, a target accuracy for completion of a unit job of a task, the task including multiple unit jobs;

retrieving, by the processor, a set of statistics for multiple workers across multiple crowdsourcing systems connected via a computer network, wherein the set of statistics include characteristics of previous responses for previous tasks performed by the multiple workers on the multiple crowdsourcing systems;

setting by the processor, for each tool of the subset of tools, a wage value for completion of each unit job of the task based on the target accuracy and based on a total wage value for completion of the task;

determining, by the processor, a number of results to be obtained for the unit job of the task based on the target accuracy, wherein said determining includes:
obtaining, for each unit job of the task, a minimum number of results and a maximum number of results for completing the unit job of the task, the maximum number of results indicative of the maximum number of results capable of being performed at the wage value for completion of each unit job of the task without exceeding the total wage value for completion of the task;

responsive to determining that a determined number of results is below the minimum number of results or greater than the maximum number of results, modifying, for each unit job, the number of results for the unit job of the task until the number of results both exceeds the minimum number of results and falls below the maximum number of results;

obtaining, by the processor, a selection, for the unit job of the task, of a subset of the multiple workers across the multiple crowdsourcing systems to generate a number of responses to the unit job based on the set of statistics, wherein a number of workers included in the selected subset of the multiple workers corresponds to the determined number of results;

transmitting, by the processor, a request over the computer network to each of the subset of the multiple workers via the multiple crowdsourcing systems, wherein each of the subset of the multiple workers are configured to perform the unit job on a corresponding crowdsourcing system of the multiple crowdsourcing systems;

receiving, by the processor, a response from each of the subset of workers that includes the response to the unit job over the computer network via the multiple crowdsourcing systems;

processing, by the processor, each received response to derive an accuracy value of each received response based on a similarity of each response to other received responses;

responsive to determining that each received response from the subset of workers exceeds the target accuracy, distributing, by the processor, wage resources to the set of workers based on the set wage value associated with each of the subset of workers and the total wage value for completion of the task; and updating, by the processor, the set of statistics relating to each of the subset of workers based on the derived accuracy value of the received response provided by each of the subset of workers.

16. The method of claim 15, further comprising:
dynamically adjusting, for each unit job, the value for completion of each unit job based on the accuracy of the received responses provided by the subset of workers selected for each unit job and the overall value for the task.

17. The method of claim 15, further comprising:
receiving an indication to perform the task from a user device associated with a requestor.

18. The method of claim 17, further comprising,
determining a total cost to complete the task using the value for completing the unit job and the number of unit jobs in the task;

in response to determining that the task has been completed and that the target accuracy has been met, assessing the total cost for the requestor.

19. The method of claim 17, wherein the indication to perform the task is received via a web interface and includes a spreadsheet specifying the task.

20. The method of claim 15, wherein the target accuracy includes a level of difficulty in completing the task or a complexity in completing the task.

21. The method of claim 17, further comprising, calibrating the task to identify the attribute, wherein calibrating includes any of:
   determining an amount of time elapsed to complete the task, determining a desired level of wage selected by the requestor, and determining an updated target accuracy specified by the requestor.

22. The method of claim 15, wherein the set of statistics for each of the multiple workers include any of a speed, an accuracy, and an answer distribution of previous responses to previous tasks provided by each of the multiple workers.

23. The method of claim 15, wherein, the task relates to any of: collection of data, moderation of content, moderation of images, verification of content, and determining a relevance of search results.

* * * * *